United States Patent [19]

Kuwana et al.

[11] Patent Number: 4,912,641

[45] Date of Patent: Mar. 27, 1990

[54] ANTISKID CONTROL SYSTEM

[75] Inventors: Kazutaka Kuwana, Toyota; Tsuyoshi Yoshida, Oobu; Shinsuke Sakane, Toyota; Hiroyuki Ichikawa, Okazaki; Nobuyasu Nakanishi, Toyota; Ken Asami, Nagoya; Tatsuo Sugitani, Mishima, all of Japan

[73] Assignee: Aisin Seiki Kabushiki Kaisha, Aishi, Japan

[21] Appl. No.: 263,575

[22] Filed: Oct. 27, 1988

[30] Foreign Application Priority Data

Oct. 27, 1987 [JP] Japan .................. 62-270795

[51] Int. Cl.$^4$ .............................. B60T 8/32
[52] U.S. Cl. .................. 364/426.02; 303/100; 303/110
[58] Field of Search ............ 364/426.01, 426.02, 364/426.03, 565; 303/3, 4, 93, 100, 101, 110, 119; 361/238

[56] References Cited

U.S. PATENT DOCUMENTS

| 4,741,580 | 5/1988 | Matsubara et al. | 364/426.02 |
| 4,749,239 | 6/1988 | Onogi et al. | 364/426.02 |
| 4,753,493 | 6/1988 | Arikawa | 303/110 |
| 4,759,590 | 7/1988 | Uchida et al. | 364/426.02 |
| 4,755,008 | 7/1988 | Imoto et al. | 303/110 |
| 4,800,498 | 1/1989 | Matsui et al. | 364/426.02 |

Primary Examiner—Gary Chin
Attorney, Agent, or Firm—Sughrue, Mion, Zinn, Macpeak & Seas

[57] ABSTRACT

An antiskid control system is disclosed in which a single solenoid-operated switching valve connects a single wheel brake selectively to a high pressure or low pressure from a source of brake pressure. After the decompression of a wheel brake pressure, a repetitive intensifying operation is executed with a period of 40 msec in which an intensifying and a decompressing operation take place alternately. During the repetitive intensifying operation, the duty cycle for the intensifying operation is increased at a given rate. A flash intensification is executed immediately before the repetitive intensification. An initial value of the duty cycle for the repetitive intensification which occurs after the decompression of a second and a subsequent pass is chosen in proportion to the time duration of the previous repetitive intensifying operation and in inverse proportion to the immediately preceding decompressing interval.

4 Claims, 9 Drawing Sheets

ANTISKID CONTROL SYSTEM

FIELD OF THE INVENTION

The invention relates to the control of a power brake system on a vehicle, in particular, to an antiskid control in which the braking power is lessened to recover the rotation of wheels to reduce a skidding of wheels with respect to a road surface where a reduction in the rotational speed of wheels caused by the braking power is rapid enough to cause an increased magnitude of skidding of wheels with respect to a road surface, and more specifically, to an improvement of an antiskid control system disclosed in a pending U.S. Pat. No. 4,831,532 issued May 16, 1989.

When a brake is applied during the time a vehicle is running on a wet or frozen road surface, the wheels may slip relative to the road surface, and cease to rotate quickly, causing a slip of the vehicle with respect to the road surface. This is particularly liable to occur when a high running speed is employed or when the brake is rapidly applied. When the wheels are locked while the vehicle is moving forward, a steering operation is difficult to achieve, which may cause a vehicle accident.

To accommodate for this, there has been proposed a remedy in which a slip rate is calculated according to the formula:

$S = 1 -$ rotational speed of wheel/vehicle speed and the brake pressure is reduced to recover the rotation of wheels whenever the slip rate $S$ is equal to or greater than a given value $S_h$ during the application of the brake. It will be understood that the vehicle speed cannot be detected accurately when a slip occurs. Accordingly, various calculation schemes ar employed in the prior art to calculate a reference speed, which is regarded as a vehicle speed to be used in the calculation of the slip rate, on the basis of the rotational speed of wheels. By way of example, for four wheel vehicle, a maximum wheel speed is chosen as a reference speed or vehicle speed.

An antiskid control of the kind described is disclosed in Japanese Laid-Open patent application No. 206,246/1984, for example. In the disclosed antiskid control system, a decompressing and an intensifying solenoid-operated open/close valve are interposed between a source of brake pressure which generates both a high and a low pressure and a wheel brake, the decompressing valve acting to open or close a path between the brake and the low pressure while the intensifying valve operating to open or close a path between the brake and the high pressure. When the decompressing valve is open while the intensifying valve is closed, the brake will be decompressed. Conversely when the decompressing valve is closed while the intensifying valve is open, the brake pressure is intensified. When the both valves are closed, the brake assumes a holding position. In this manner, this brake pressure control system is effective to control the brake pressure among three modes, namely, decompression, holding and intensifying mode.

Recently, an arrangement which provides smoother or finer control over the brake pressure of a vehicle is proposed. In this arrangement, the decompressing valve is alternately turned on (open) and off (closed) while maintaining the intensifying valve closed to achieve a gradual decompression, with the duty cycle (on/off) controlled to establish a decompressing rate. Similarly, the intensifying valve is alternately turned on (open) and off (closed) while maintaining the decompressing valve closed to provide a gradual intensification, with the duty cycle (on/off) controlled to establish an intensifying rate. A smooth control over the brake pressure is achieved by a combination of the decompression, gradual decompression, holding, gradual intensification and intensification, together with a control of the duty cycle as desired.

ISSUES TO BE SOLVED BY THE INVENTION

However, a brake pressure control system which is capable of implementing a holding mode requires a pair of solenoid-operated open/close valves which allow the brake of the vehicle to be selectively connected with a high pressure output port (intensification) and a low pressure output port (decompression) of the source of brake pressure and which allows the brake to be disconnected from either output port (holding mode) or requires a single three position switching solenoid-operated valve which selectively connects the brake of the vehicle to the high pressure, the low pressure or the holding position (namely, disconnection from either high or low pressure). It is to be understood that the three position switching solenoid-operated valve is substantially equivalent to the pair of solenoid-operated decompressing and intensifying open/close valves in construction and cost. For a vehicle having four wheels, for example, a total of $2 \times 4 = 8$ solenoid-operated valves are required in order to provide an independent control over the pressure of the brakes associated with the individual wheels. Alternatively, four three position switching solenoid-operated valves are required. In either instance, an increased number of mechanical elements are required, causing an increased cost.

SUMMARY OF THE INVENTION

It is an object of the invention to reduce mechanical elements relating to solenoid-operated valves which are used to control the brake pressure of a vehicle in order to reduce the cost while at the same time providing as smooth control over the brake pressure as possible.

An antiskid control system according to the invention comprises an onboard source of brake pressure which generates a high pressure and a low pressure; switching valve means interposed between a wheel brake of a vehicle and the onboard source for selectively connecting a fluid path leading to the wheel brake to the high and the low pressure; means for detecting the rotational speed of a wheel on which the wheel brake is mounted; calculation means for calculating a reference speed on the basis of the rotational speed of the wheel which is detected by the detecting means; decompression decision means for determining the need to decompress on the basis of the rotational speed and the reference speed; and brake pressure control means for establishing a decompressing mode for the switching valve means in which a fluid path leading to the wheel brake is connected to the low pressure when the decompression decision means determines the need to decompress and for repeatedly alternating between an intensifying mode in which the fluid path leading to the wheel brake is connected to the high pressure and the decompressing mode when the decision means changes its decision from the need to decompress to no need to decompress, the control means sequentially increasing the duty cycle of the intensifying mode during each successive repetition and also determining the duration of the alternate repetition so that an initial value is chosen for the duty cycle which increases with an increase in the duration of the repetitions whenever the decompression decision means repeatedly determines the need to decompress.

With this arrangement, the switching valve means selectively connects the wheel brake selectively to the low and the high pressure of the source of brake pressure, and thus has a substantially equivalent number of mechanical elements as the decompressing (or intensifying) solenoid-operated valve. Accordingly, where the brake pressure of the four wheels are to be controlled independently, four switching valves is all that must be provided. In other words, in terms of the number of mechanical elements used, the number of valves is reduced to one-half or four in contrast to the eight valves required in the prior art arrangement, thus reducing the cost for the valves while also achieving a saving in the devoted space for the provision of the valves.

It will be seen that merely using the valve means switching between the high and the low pressure is only capable of selecting a decompression and the intensification, but is incapable of establishing a holding mode, resulting in a rough control over the wheel brake pressure achieved. To cater for this, the brake pressure control means is introduced in accordance with the invention to provide a smooth control over the pressure of the wheel brake. Specifically, the brake pressure control means establishes a wheel brake pressure which corresponds to a gradual decompression, holding and a gradual intensification with a duty cycle (the term "duty cycle" as used herein refers to the ratio of off interval divided by one on/off period or the ratio of the intensifying interval divided by the sum of the intensifying and the decompressing interval) when the switching valve means is repeatedly turned off (intensification, connecting the wheel brake to the high pressure) and on (decompression, connecting the wheel brake to the low pressure). When the decision means changes from the need to decompress to no need to decompress, the duty cycle is increased from a low value to a higher value, thus sequentially increasing the pressure applied to the wheel brake. Simply stated, a duty cycle around 50% corresponds to the holding mode. A lower range of duty cycles corresponds to a gradual decompression while a higher range of duty cycles corresponds to a gradual intensification. Accordingly, by sequentially increasing the duty cycle, there is achieved a control over the wheel brake pressure which is equivalent to a transition achieved in the prior art from the holding mode to the intensifying mode or a prior art transition from the gradual decompression, holding, gradual intensification and intensification.

When the pressure is controlled in this manner through a duty cycle control, the rate of increase of the wheel brake pressure may dependent on a particular value of the wheel brake pressure which prevailed immediately before the duty cycle control is entered, even for the same value of the duty cycle employed. A problem then arises if the duty cycle control is repeated in a given pattern that the brake pressure may rise at a slow rate to increase the braking distance or that the brake pressure rises at a rapid rate, requiring an early decompression and resulting in an increased fluctuation in the brake pressure. Accordingly, in accordance with the invention, the brake pressure control means chooses an initial value when entering the duty cycle control which increases with the time duration of the prev duty cycle control or the number of periods du which the duty cycle control has been repeated. In manner, a significant increase in the braking distan eliminated as is an increased fluctuation in the b pressure. In other words, the brake pressure ca smoothly and reliably controlled. It will be seen that time duration or the number of periods during wl the previous duty cycle control has been repeated responds to an optimum brake pressure that prevaile that time, and this provides a measure for the estim optimum for the wheel brake pressure. During the lowing duty cycle control, an initial value is chosen manner corresponding to this estimated optimum, providing a duty cycle control pattern which cc sponds to the optimum value of the wheel brake ṛ sure.

On the other hand, it will be appreciated that wheel brake pressure at the commencement of the ( cycle control also depends on the immediately pre( ing decompressing interval. Accordingly, in a prefe embodiment of the invention, the brake pressure cor means also determines the length of the decompres interval to adjust the initial value of the duty c which is to be used during the duty cycle control.

When the switching valve means is alterna switched between the intensifying and the decompr ing mode or to the duty cycle control, the initial inte fication may be cancelled out due to a time lag in operation of mechanical elements such as a plunge the switching valve means or due to the occurrenc a negative pressure caused by a movement of mech cal elements to produce a disturbance upon the pres rising pattern of the duty cycle control which oc subsequently. Accordingly, in a preferred embodin of the invention, when a switching is made from decompressing mode to the duty cycle control, wheel brake pressure is increased (flash intensificat during a given time period or a given time interv: the last cycle of the previous duty cycle control be initiating the next following duty cycle control. In manner, any lag in the intensification which may caused by the operation of the switching valve mean cancelling effect is compensated for by a tempo flash intensification before the duty cycle contrc entered.

Other object and features of the invention will come apparent from the following description of embodiment thereof with reference to the follow drawings.

BRIEF DESCRIPTION OF THE DRAWING

FIG. 1b is a block diagram of an electronic contrc 10 shown in FIG. 1a;

DESCRIPTION OF PREFERRED EMBODIMENT

Figure 1A:
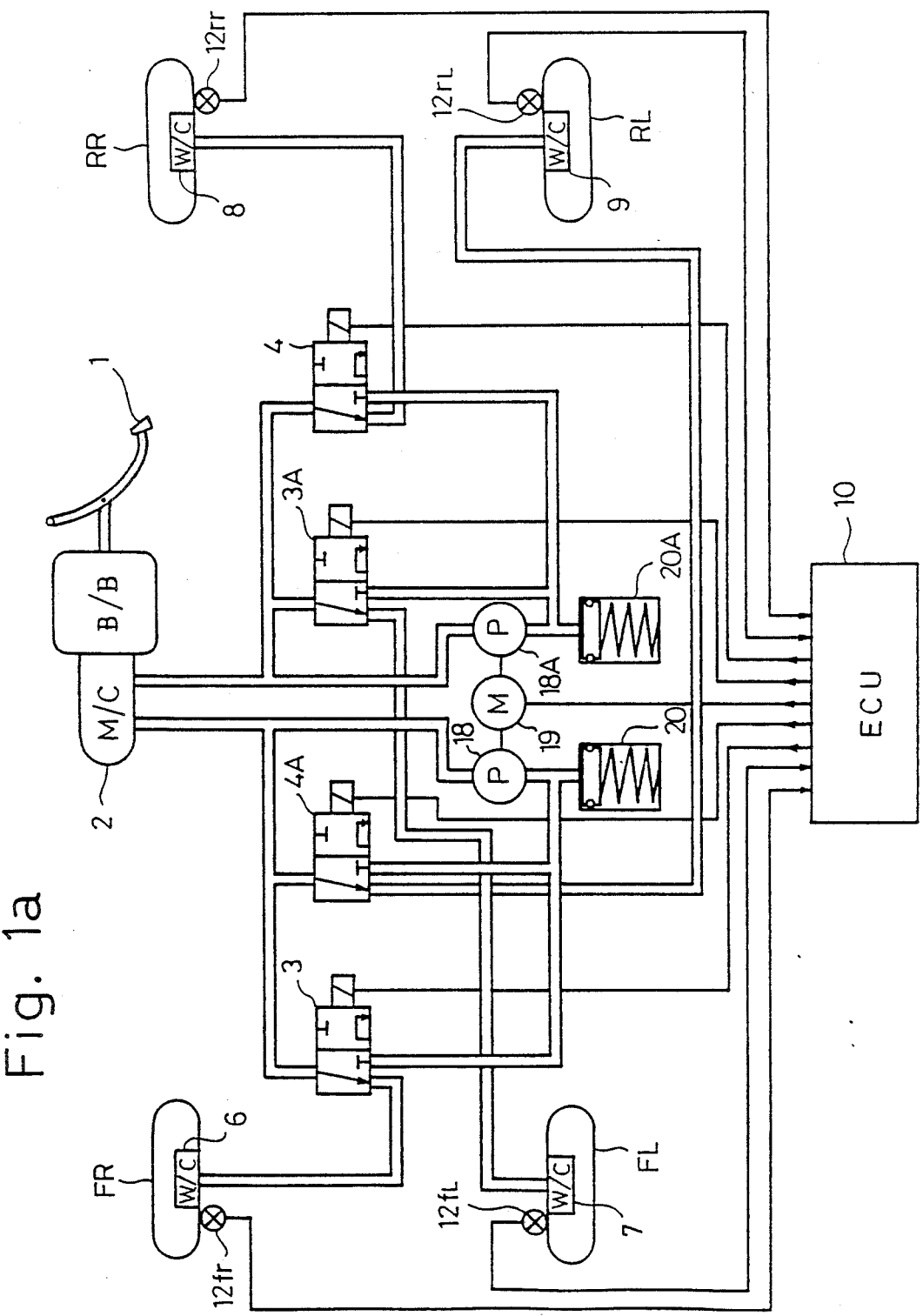
FIG. 1a is a block diagram of a brake system acc( ing to one embodiment of the invention.

Referring to FIG. 1a, there is shown a system according to one embodiment of the invention schematically. When a brake pedal 1 is depressed by a driver, a brake pressure which corresponds in magnitude to the degree of depression is applied through solenoid-operated switching valves 3, 3A, 4 and 4A to a brake 6 associated with a right, front wheel FR, a brake 7 associated with a left, front wheel FL, a brake 8 associated with a right, rear wheel RR and a brake 9 associated with a left, rear wheel RL, respectively.

Each of the valves 3, 3A, 4 and 4A represents a two position three-way valve. When its electrical coil is not energized, each of such valve connects an associated wheel brake 6 to 9 to a brake pressure output port of a brake master cylinder 2 (establishes an intensifying mode), as shown in FIG. 1a. The output port communicates with a high pressure output (discharge) port of a pair of pumps 18, 18A, both of which are driven by an electric motor 19. Each of the pumps 18, 18A also includes a low pressure output (suction) port which is connected to a reservoir 20 or 20A, respectively. When its electrical coil is energized, each of the valves 3, 3A, 4 and 4A connects the associated wheel brake 6 to 9 with a low pressure output port of either pump 18 or 18A (establishes a decompressing mode).

Each of right, front wheel FR, left, front wheel FL, right, rear wheel RR and left, rear wheel RL is associated with a speed sensor 12fr, 12fL, 12rr or 12rL, respectively, which detects the rotational speed of the associated wheel.

When the pumps 18, 18A are driven, a brake oil from the reservoir 20 is drawn by the pump 18 to be supplied to the first valve 3 and the fourth valve 4A while a brake oil from the reservoir 20A is drawn by the pump 18A to be supplied to the second valve 3A and to the third valve 4. It will be noted that the electrical coils of the first to the fourth valves 3 to 4A, the motor 19 and the speed sensors 12fr to 12rL are connected to an electronic controller 10.

Figure 1B:
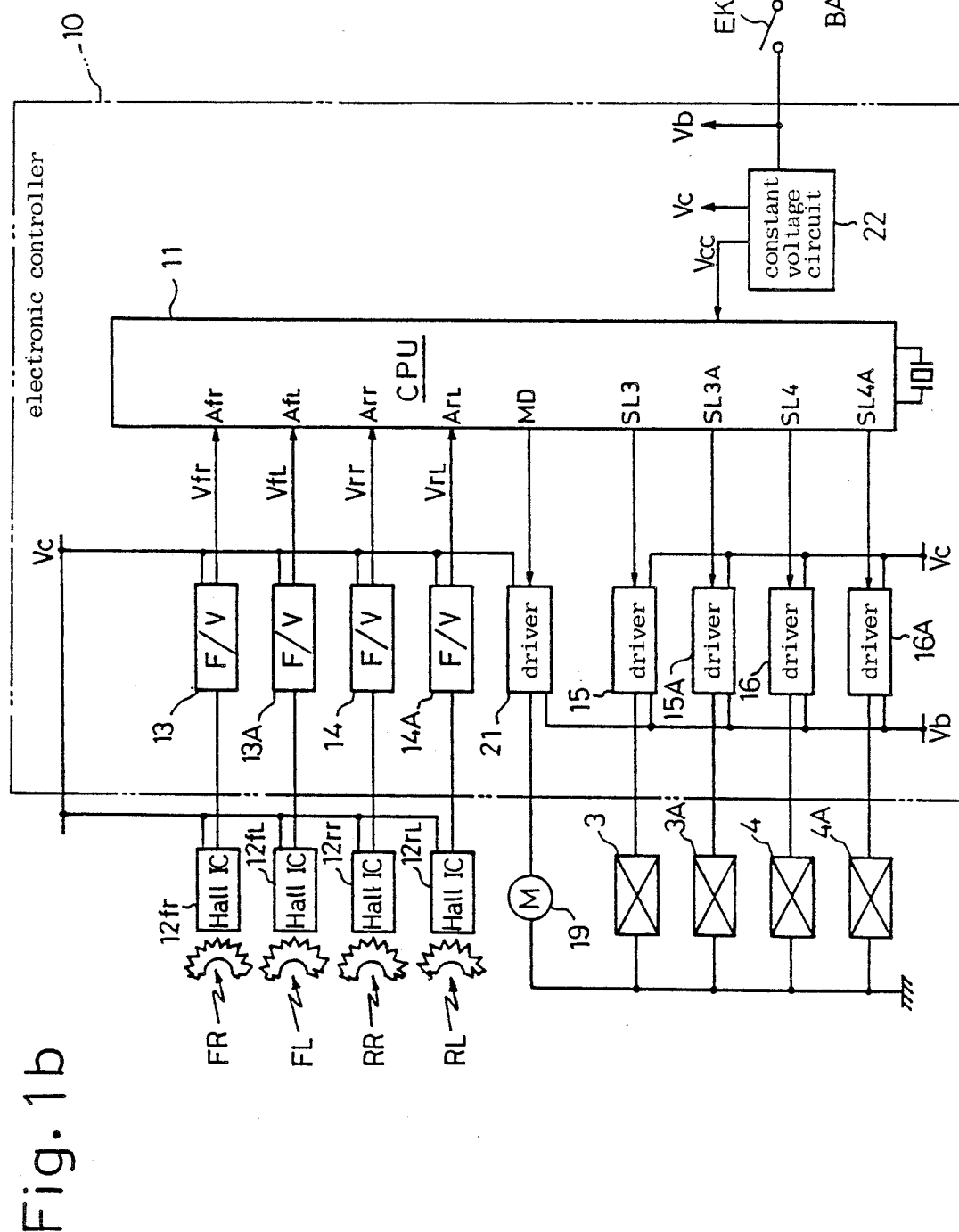

The detail of the electronic controller 10 is shown in FIG. 1b. Each of the speed sensors 12fr to 12rL comprises a Hall IC (including a Hall element detecting the magnitude of a magnetic field and a digitizer which digitizes a detected signal into a binary signal), and responds to the rotation of a permanent magnetic ring in the form of a gear coupled to an associated wheel axle to develop an electrical pulse of a frequency which is proportional to the rotational speed thereof. Such pulses are fed to frequency-to-voltage converters 13, 13A, 14, 14A, respectively, each of which develops a voltage having a level which is proportional to the frequency of the input electrical signal and feeds it to A/D converter input terminals Afr to ArL of a microprocessor 11.

An onboard battery BA is connected through an engine key switch EKS to a constant voltage circuit 22. When the switch EKS is closed, a constant voltage Vcc is supplied to the microprocessor 11, and another constant voltage Vc is supplied to the converters 13 to 14A and Hall IC's 12fr to 12rL. It is to be noted that a motor driver 21 and solenoid drivers 15, 15A, 16 and 16A receive a battery voltage Vb.

Figure 2:
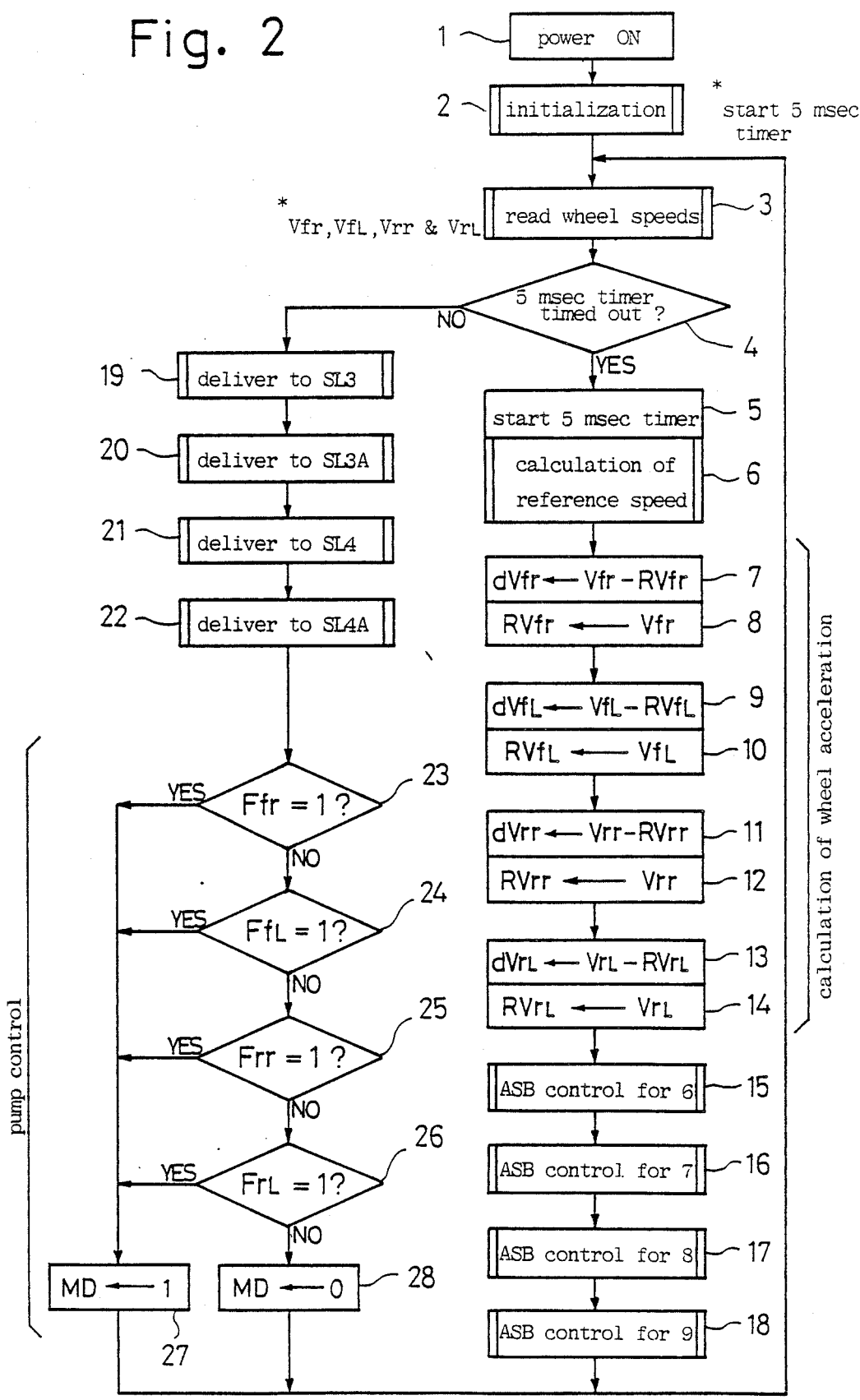
FIG. 2 is a flow chart of a control operation by C 11 shown in FIG. 1b.

FIG. 2 is a flow chart which generally illustrates a brake pressure control operation by the microprocessor 11, which operation will be described with reference to FIG. 2.

1. Initilization (steps 1, 2)

When the engine key switch EKS is closed and the constant voltage circuit 22 develops a constant voltage Vcc of a given level, the microprocessor 11 is booted up (step 1), clearing its internal registers, counters and timers, delivering or latching "0" (indicating to stop the pump by deenergizing the motor 19) at its output port MD, and also delivering or latching "0" (connecting the valves 3, 3A, 4 and 4A in the "intensifying" mode shown in FIG. 1a) at its output ports SL3, SL3A, SL4 and SL4A. (step 2).

2. Read vehicle speed (routine 3)

Analog signals from A/D conversion input ports Afr, AfL, Arr and ArL are sequentially converted into corresponding digital data, which are then written into vehicle speed registers Afr, AfL, Arr and ArL, respectively.

3. Calculation of reference speed Vs (routine 6; see FIG. 3a for detail)

A maximum one of the vehicle speed Afr, AfL, Arr and ArL are picked up as Vh, which is then compared against a value Vs stored in a reference speed register Vs. If Vh≧Vs, the register Vs is updated by writing Vh into it. If Vh<Vs (it is assumed that the prevailing content of the reference speed register Vs is denoted by Vs$_0$), a time interval T$_0$ begins to be counted, starting from the time when this inequality applies. Subsequently, each time a new vehicle speed is read, the reference speed register Vs is updated to (Vs$_0$−k1·T$_0$) as long as the inequality Vh<Vs applies and if the duration T$_0$ is less than or equal to a given value Tp. When the duration becomes equal to or exceeds the value Tp (prevailing content of the reference register Vs being denoted by Vs$_1$), the reference speed register is subsequently updated to Vs$_1$−k2·(T$_0$−Tp).

Figure 4A:
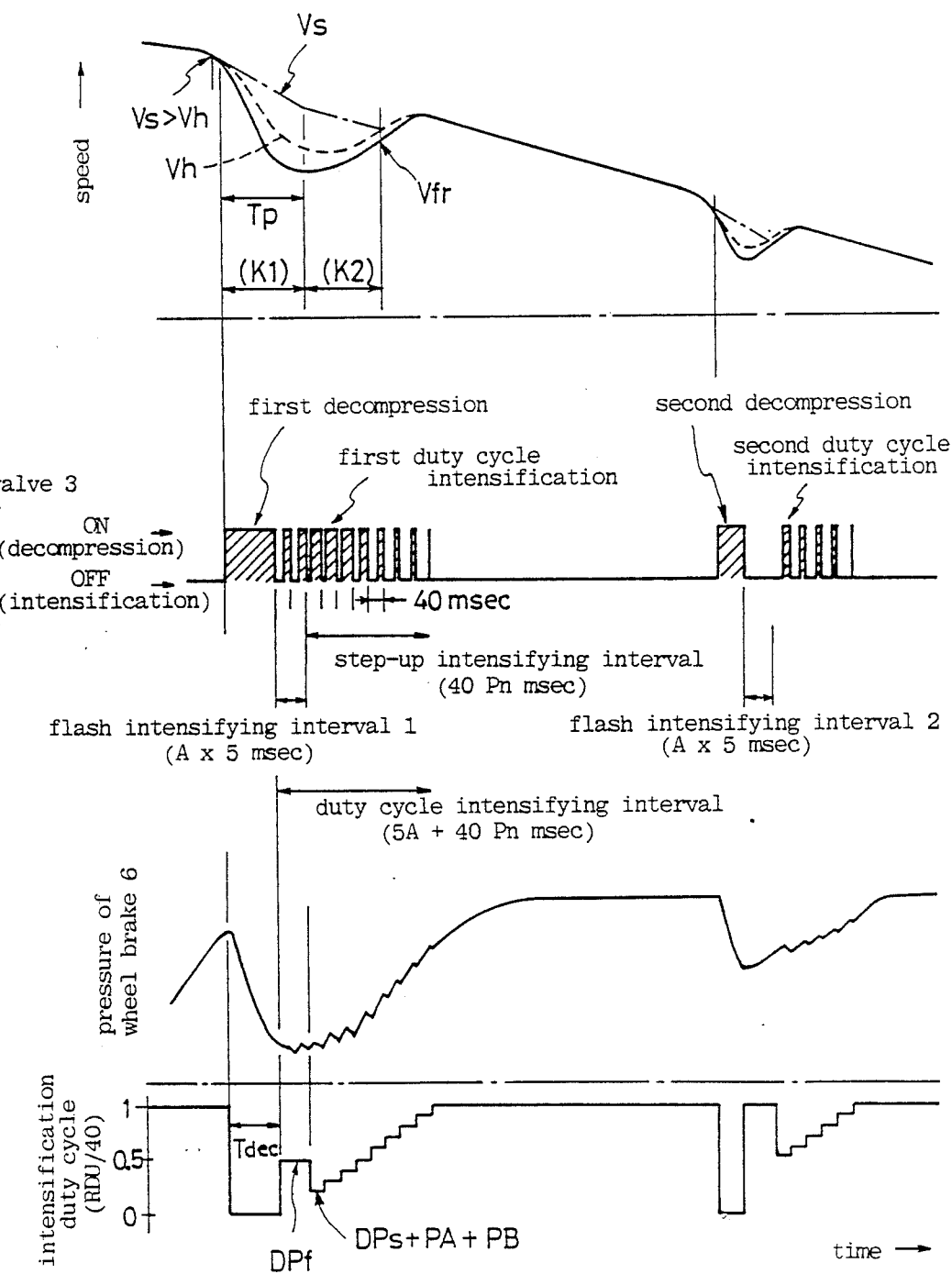
FIG. 4a is a timing chart indicating the relation: between a vehicle speed, a reference speed and a wł brake pressure which are calculated and control respectively, by CPU 11, an on/off condition of a s noid-operated switching valve 3 and a duty cycle.

When the maximum value Vh of the vehicle speeds Afr, AfL, Arr and ArL becomes equal to or greater than the content Vs of the reference speed register Vs, Vh is written into this register Vs. As a consequence, a maximum value of a speed curve shown in FIG. 4a is written into the reference speed register Vs (a solid line curve representing speed Vfr for the right, front wheel; dotted line curve representing the maximum value of the four wheel speeds; and a phantom line curve representing a calculated value obtained by applying a given deceleration speed k1, k2). This represents a reference speed which is estimated to be a vehicle speed.

4. Calculation of vehicle acceleration (steps 7 to 14 in FIG. 2)

An acceleration dVfr for the right, front wheel FR is obtained by subtracting the content RVfr of a previous vehicle speed register RVfr, in which a wheel speed, determined during a previous pass, is written, from a current wheel speed Vfr, and is written into an acceleration register dVfr (step 7). The calculation of a wheel acceleration is executed with a period of 5 msec by a repeated timer operation having a period of 5 msec at steps 4 and 5, and the result of the subtraction represents a change in the speed (acceleration) which has occurred during the interval of 5 msec. The result indicates an acceleration if it is positive and indicates a deceleration if it is negative. Subsequent to the calculation, the current vehicle speed Vfr is written into the previous vehicle speed register RVfr (step 8). The calculation of an acceleration for the remaining wheels, namely, the left, front wheel FL, right, rear wheel RR and left, rear wheel RL takes place in a similar manner (steps 9 to 14).

5. Antiskid brake pressure (ASB) control (routines 15 to 18; see FIG. 3b for detail)

Considering the right, front wheel FR, the need to effect an ASB control (which may begin with a decompression) is initially determined. A slip rate Sfr for the wheel FR is determined according to the following formula:

$$Sfr = 1 - Vfr/Vs$$

Figure 4B:
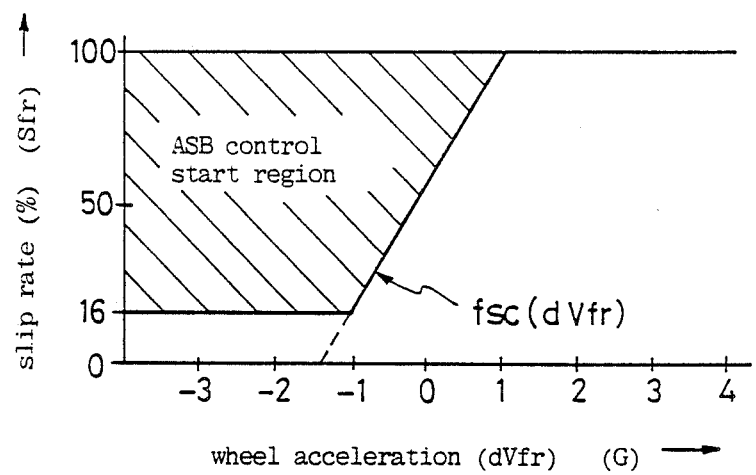
FIG. 4b graphically indicates the relationship between a slip rate of a wheel, its acceleration and an antiskid brake pressure control region.

In this manner, it is determined if Sfr and the acceleration dVfr lie within an ASB control start region which is shown hatched by lines extending downwardly to the right in FIG. 4b.

Figure 4C:
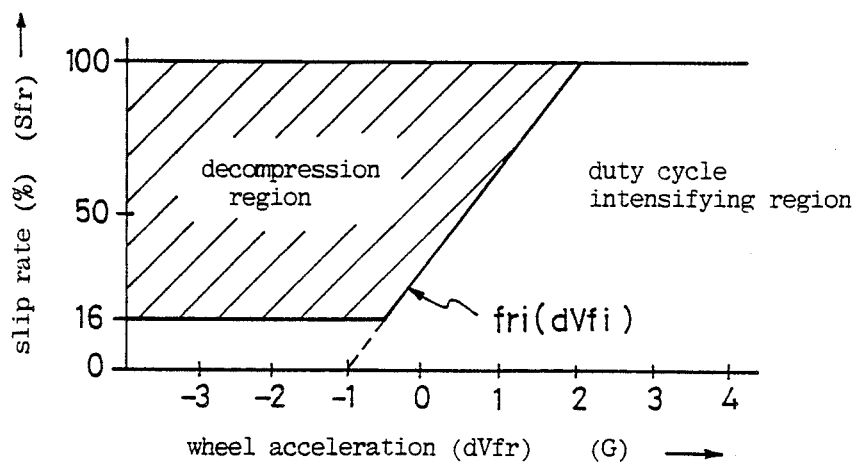
FIG. 4c graphically shows a relationship between a slip rate of a wheel, its acceleration, a decompression region and a duty cycle intensifying region.

If it is determined that the operation is now in the ASB control start region, a flag register Ffr is set to "1". It is then determined if Sfr and the acceleration dVfr lie in a decompression region (shown hatched in FIG. 4c by lines extending downardly to the left) or in a duty cycle intensifying region. When the operation is in the decompression region, its time duration Tdec is determined. When the decision switches from the decompression region to the duty cycle intensifying region, a duty cycle DPf for the flash intensifying mode (the duty cycle control employs a period of 40 msec and DPf represents a fraction of the intensifying time interval during such one period) is determined and written into a duty cycle register RDU. When entering the duty cycle intensifying mode for the first time after the commencement of the ASB control, DPf comprises a standard duty cycle value DPs added with a flash increment a. However, when the duty cycle intensifying mode is entered for the second and subsequent time after the decompression has once taken place as when the process proceeds through decompression—duty cycle intensification—decompression —duty cycle intensification ....., DPf is chosen to be the maximum or the latest duty cycle which occurs during the previous duty cycle intensifying mode. When the duty cycle for the flash intensification is chosen in this manner, an initial value for the duty cycle intensifying mode is determined at the time when A×5 msec has passed subsequently, and is written into the duty cycle register RDU. For the duty cycle intensifying mode which takes place for the first time, the initial value is equal to the standard value DPs. During the second, and subsequent duty cycle intensifying mode, the initial value is equal to DPs+PA+PB where PA represents an adjustment for the initial value which corresponds to the number of periods Pn for which the previous duty cycle intensifying mode has been executed, or Pn×40 msec in terms of the time length, since one period is equal to 40 msec. The value of PA is predetermined with respect to Pn as illustrated by a relationship shown in FIG. 4e, and is stored in an internal memory of CPU 11. PB represents an adjustment for the initial value which corresponds to the time duration Tdec of the previous decompression, and is predetermined with respect to Tdec in a manner illustrated in FIG. 4f, and is stored in an internal memory within CPU 11.

When the time duration of the duty cycle intensifying mode reaches one second or when Vs becomes equal to or less than 7 km/h, the flag register Ffr is cleared to "0", thus terminating the ASB control. During the time the flag register Ffr remains to be "1", a decision is rendered to see if the relationship between the slip rate Sfr and a wheel acceleration dVfr is located in either the decompression region and the duty cycle intensifying region shown in FIG. 4c for deriving data which represents the intensification or the decompression. The ASB control for the remaining wheels takes place in the similar manner as mentioned above.

6. Output control (routines 19 to 22; see FIG. 3c for detail)

Considering the first solenoid-operated switching valve 3 which controls the brake pressure applied to the brake 6 for the right, front wheel FR, as long as the need to effect the ASB control is denied in the manner mentioned in the paragraph 5 above, "0" is delivered to the output port SL3, thus establishing "intensifying" connection for the switching valve 3 as shown in FIG. 1a.

When the need to effect the ASB control is determined and the decision indicates that the operation is in the decompression region, "1" is delivered to the output port SL3 to energize the third switching valve 3 to establish a condition in which the wheel brake 6 is connected to the low pressure output port (reservoir 20) of the pump 18. If the operation is in the duty cycle intensifying region, "0" indicating the deenergization or an intensifying mode) is delivered to the output port SL3 for a time interval corresponding to the content RDU msec of the duty cycle register RDU (or DPf msec) if the time which has passed since the termination of the previous decompression is within A×5 msec (flash intensifying interval). Subsequently, "1" (commanding the energization or decompression) is delivered to the output port SL3 during (40−RDU) msec which follows, thus energizing the switching valve with the duty cycle of "RDU/40" to perform a flash intensifying operation. During a first period after the time has passed A×5 msec the duty cycle is determined by the content RDU in the duty cycle register RDU. Specifically, since one period is equal to 40 msec, an intensifying mode is adopted during DPs msec or DPs+PA+PB msec which represents the initial value while the decompression is adopted during the remaining interval of the same period. During a second period, in which one period remains to be 40 msec, the intensifying mode is adopted during a time interval corresponding to (the initial value+2 msec) while the decompression is employed during the remaining interval, thus employing a duty cycle which is one step higher. During a third and subsequent period, a duty cycle which is by one step higher than the previous duty cycle, or which corresponds to an intensifying interval that is by 2 msec longer than that used during the immediately preceding period is delivered to the output port SL3, thus alternately delivering an output "0" for the intensifying operation and an output "1" for the decompression. In this manner, the duty cycle varies in a manner shown in the bottom curve of FIG. 4a, and the wheel brake pressure varies in a manner indicated by the second curve from the bottom in FIG. 4a.

Figure 4D:
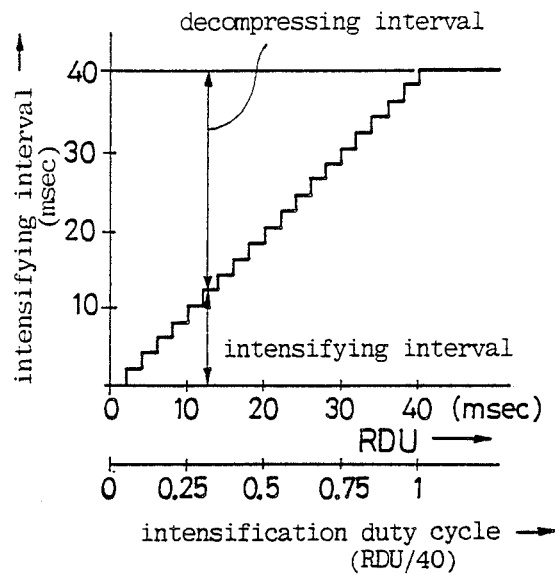
FIG. 4d graphically shows a relationship between a duty cycle and an intensifying time interval during the duty cycle control of the brake pressure.
Figure 4E:
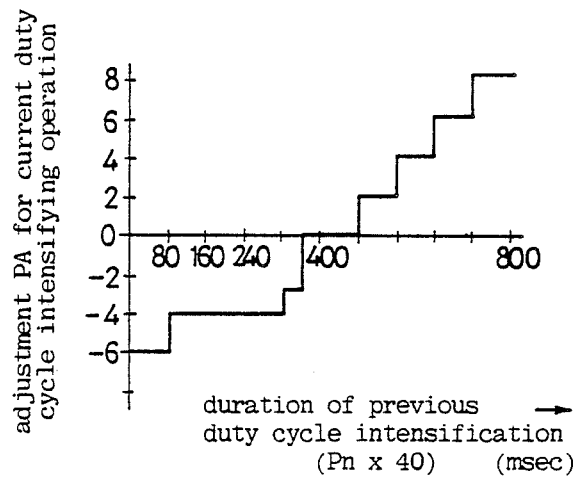
FIG. 4e graphically shows a relationship between a previous duty cycle intensifying time interval and an adjustment for the initial value of the current duty cycle intensification; an FIG. 4f graphically shows a relationship between the time duration of decompression which occurs immediately before a duty cycle intensification and an adjustment for the initial value of the duty cycle intensification.
Figure 4F:
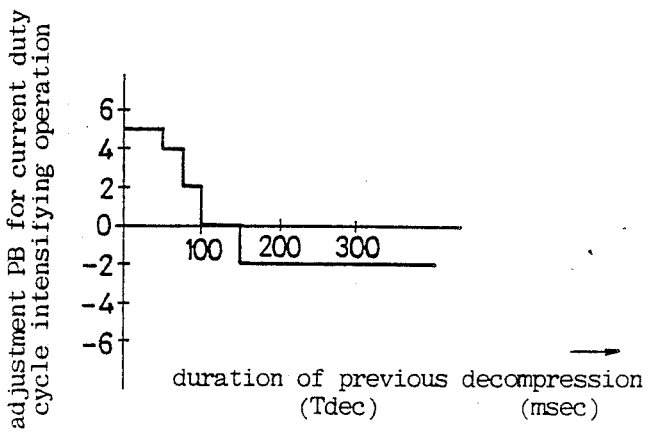

FIG. 4d graphically shows a relationship between the value of the duty cycle and the intensifying interval/decompressing interval during one period (40 msec) during the duty cycle control described above. It will be appreciated that a duty cycle equal to or greater than 1 represents the full intensification while a duty cycle equal to or less than 0 represents the full decompression.

A control over the second to the fourth solenoid-operated switching valves 3A, 4 and 4A for determining the pressures applied to the brakes 7, 8 and 9 associated with the remaining wheels FL, RR and RL takes place in the similar manner as the control (routine 15) over the first switching valve 3 mentioned above.

7. Pump control (steps 23 to 28 in FIG. 2)

When the relationship between the slip rate and the acceleration for each of the wheels is determined to lie in the ASB control region shown in FIG. 4b in the manner mentioned under the paragraph 5, flag registers Ffr, FfL, Frr and FrL corresponding to the respective wheels are set to "1" to initiate the ASB control. Any one of these flag registers is reset to "0" or cleared whenever the time duration of the duty cycle intensifying mode reaches 1 sec or Vs becomes equal to or less than 7 km/h during the ASB control.

During the pump control, when at least one of the flag registers Ffr, FfL, Frr and FrL is set to "1", "1" commanding the energization of the motor 19 is delivered or latched on the output port MD. When all of these flag registers are reset to "0", "0" commanding to cease the energization of the motor 19 is delivered to the output port MD. In this manner, the motor 19 remains energized to drive the pumps 18, 18A as long as the ASB control (either decompression or duty cycle intensification) takes place with respect to at least one wheel.

Figure 3A:
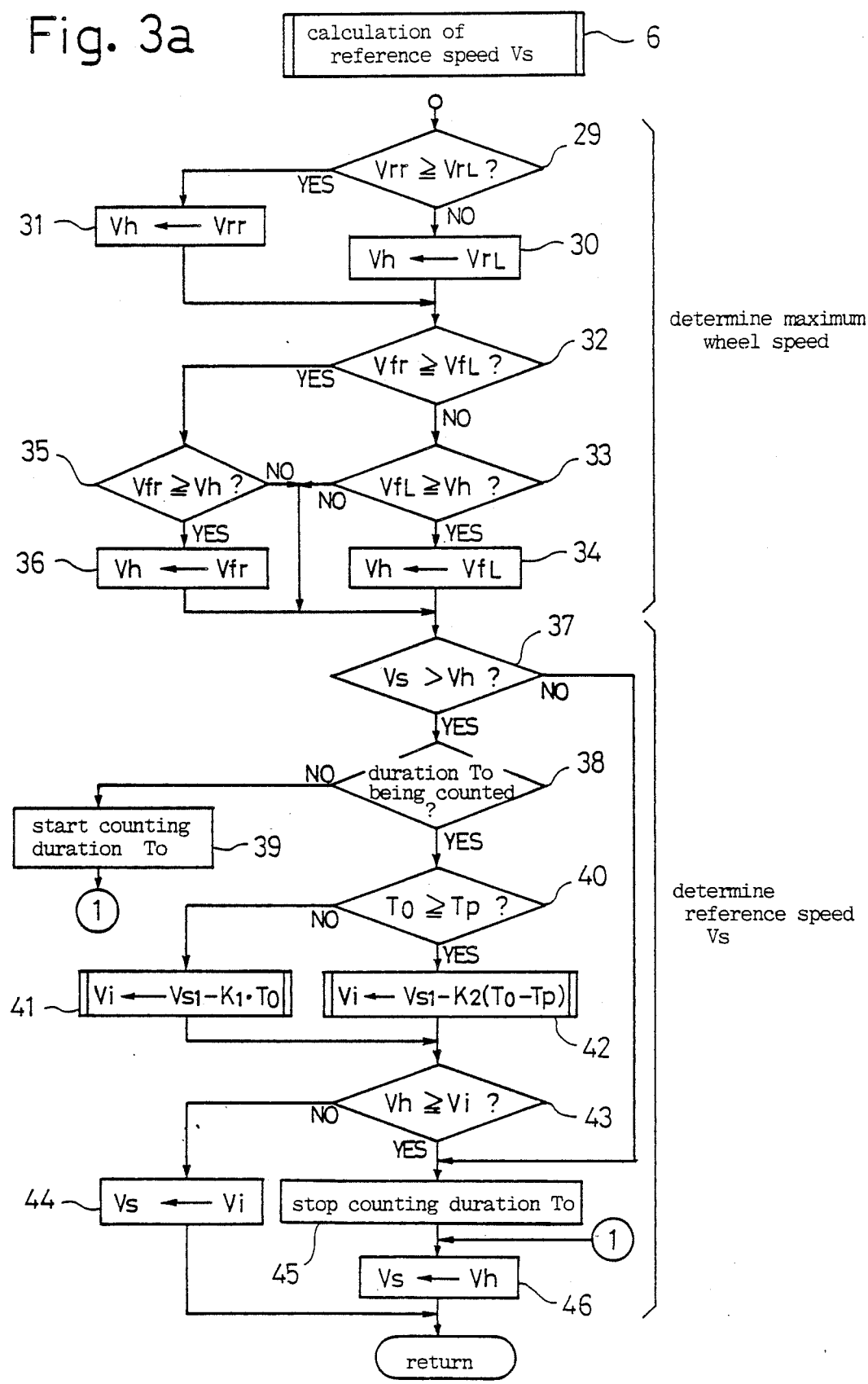
FIGS. 3a, 3b and 3c are flow charts indicating detail of essential parts of the control operation shov FIG. 2.

The calculation of the reference speed which takes place in the routine 6 will be described more specifically with reference to FIG. 3a. The calculation of the reference speed Vs is executed with a period of 5 msec since it is executed during the timer operation at steps 4 and 5 (see FIG. 2). When entering the routine 6, CPU 11 initially compares the vehicle speeds Vfr and VfL for the front wheels against each other, and chooses a higher one of them to be written into the register Vh (steps 29 to 31). It then compares the speeds Vrr and VrL for the rear wheels against each other and chooses a higher one, which is then compared against the value stored in the register Vh, with a higher value being chosen to be written into the register Vh (steps 32 to 36). As a consequence, the register Vh now stores the maximum speed among the individual wheel speeds which have currently been read. CPU 11 then compares the content of the reference speed register Vs against the content of the register Vh, and if $Vh \geq Vs$, it writes Vh into the register Vs (steps 37, 46).

If $Vh < Vs$, Vs is written into the register $Vs_0$, and the time duration $T_0$ begins to be counted (steps 38, 39). While the counting of the time duration is continued, it is determined if the duration $T_0$ has reached the given value Tp. As long as $T_0$ is less than Tp, CPU 11 calculates $Vi = Vs_0 - kl \cdot T_0$, which is then written into a register Vi. It then compares Vi against Vh, and if $Vi > Vh$, Vi is written into the reference speed register Vs (steps 40-41-43-44). When the time duration $T_0$ reaches Tp, Vs is written into a register $Vs_1$, and subsequently CPU 11 calculates $Vi = Vs_1 - k2 \cdot (T_0 - Tp)$, which is then written into the register Vi. It then compares Vi against Vh, and if $Vi > Vh$, Vi is written into the reference speed register (steps 40-42-43-44). In either event, whenever $Vi \leq Vh$, a counting operation of the time duration $T_0$ is interrupted, and Vh is written into the reference speed register Vs (steps 43-45-46).

As a result, the value written into the reference speed register Vs represents the maximum vehicle speed Vh shown in dotted lines or a calculated value applying a given deceleration (kl, k2) shown in phantom lines in FIG. 4a, whichever is the greater. It will be appreciated that k1 and k2 corresponds to an upper limit for the deceleration which is chosen for safety purpose when decelerating without accompanying a wheel lock.

Figure 3B:
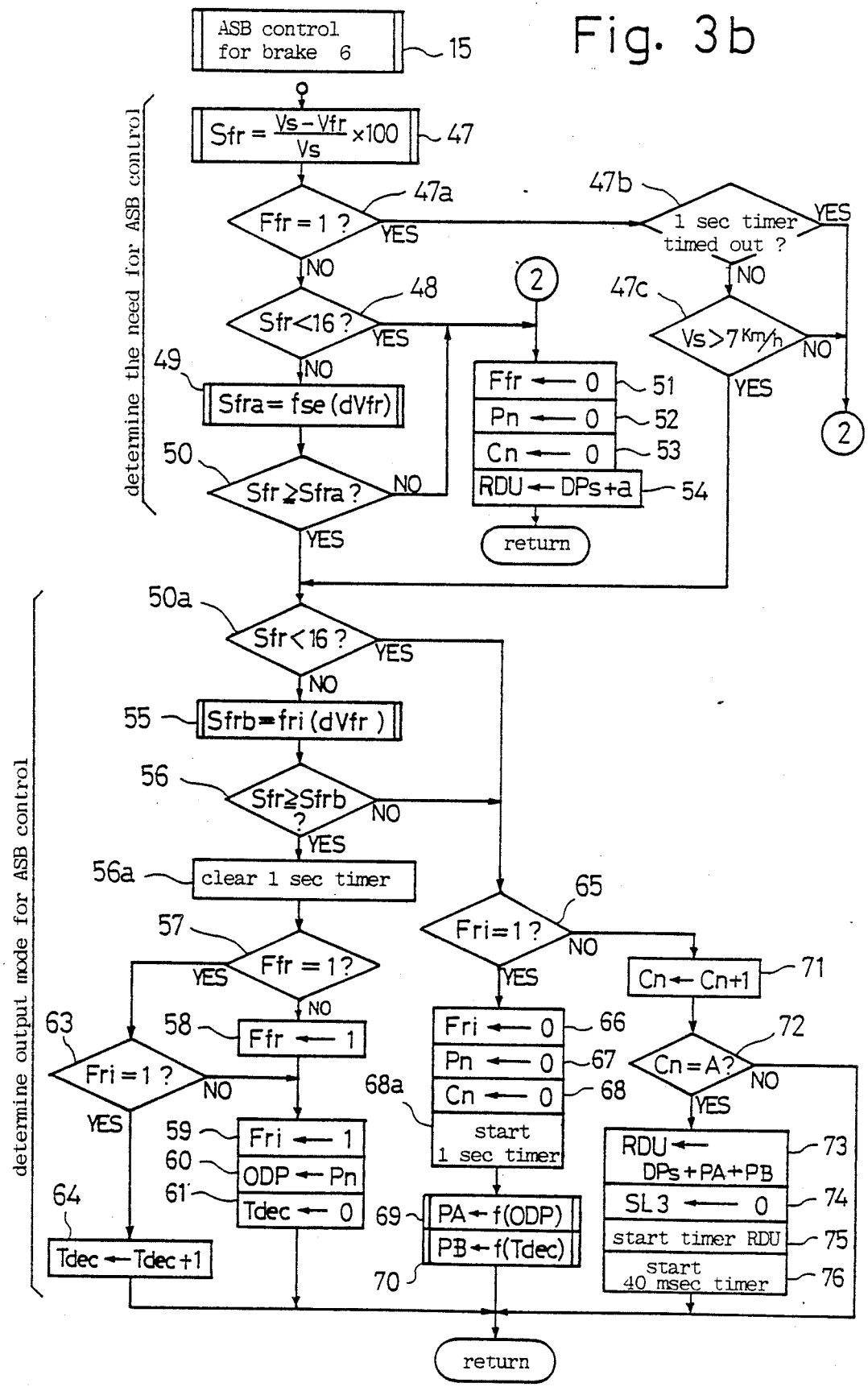

The ASB control (step 15) for the brake 6 associated with the right, front wheel FR will be described more specifically with reference to FIG. 3b. It is to be understood that the ASB control is also executed with the period of 5 msec. When entering the ASB control routine 15, CPU 11 initially calculates the slip rate Sfr (step 47), examines the flag register Ffr (step 47a), and if it is equal to "0", indicating the absence of the ASB control, determines if the relationship between the slip rate Sfr and the acceleration dVfr lies in the ASB control start region shown in FIG. 4b (steps 48 to 50). If the slip rate Sfr (%) is less than 16, the operation cannot be in the start region, and accordingly, it is initially examined (step 48) if Sfr is equal to or greater than 16. If it is equal to or greater than 16, the current value of the acceleration dVfr is substituted into a function S=fse (dVfr) which represents a boundary between the ASB start region and the termination region, to calculate a corresponding (boundary) slip rate (routine 49).

Sfra = fse (dVfr)

It is determined if the current slip rate Sfr is equal to or greater than Sfra, indicating that the operation is in the ASB control start region (step 50). If it is determined that the operation is outside the ASB control start region, the program proceeds to establish data for the brake pressure control mode which begins with a subroutine 55. On the contrary, if it is determined that the operation is outside the ASB control start region or as lying in the ASB control termination region, registers which are used during the brake pressure control mode to be described later are cleared (steps 51 to 53), and data representing a duty cycle which will be used during the first, flash intensifying mode during the ASB control or more exactly, the intensifying interval of one period is written into the duty cycle register RDU (step 54). In this manner, a standard value for the first flash intensifying mode is determined.

When it is determined that the operation is in the ASB control start region, CPU 11 initially examines Sfr to see if it is equal or greater than 16 (step 50a), and if it is, it utilizes a logic similar to that used in the decision to see if the operation is in the ASB control start region to determine if the relationship between the current slip rate Sfr and the current acceleration dVfr lies in the decompression region or duty cycle intensifying region shown in FIG. 4c (steps 55 and 56). If it is determined that the operation is in the decompression region, data to perform the decompression is established at steps 57 to 54 while if the operation is found to be in the duty cycle intensifying region, data for performing the duty cycle intensifying operation is established at steps 65 to 76.

Initially it is assumed that a decision is rendered that the operation is now in the decompression region for the first time after it is determined that the operation is in the ASB control start region. CPU 11 then starts 1 sec timer which monitors the time duration of the duty cycle intensifying mode (step 56a), writes "1" into the flag register Ffr (steps 57-58), writes "1" into the register Fri which indicates the execution of the decompression (step 59), writes the number of periods Pn in which the previous duty cycle intensifying operation has been executed (which number is made equal to "0" at step 52 for the decompression which occurs for the first time after entering into the ASB control start region, but during the second and subsequent pass, the number of periods in which the previous duty cycle intensifying operation has been executed is employed) into a register ODP (step 60) and clears decompression time register Tdec (step 61).

Subsequently, the time duration of the decompression of the first pass is determined through steps 57-53-54 until the time duration of the duty cycle intensifying operation during the ASB control reaches 1 sec or Vs becomes equal to or less than 7 km/h.

Subsequently, when the relationship between the slip rate Sfr and the wheel acceleration dVfr is such as shown by the duty cycle intensifying region shown in FIG. 4c, the flag register Ffi which now stores "1", indicating the decompression, is now cleared (steps 65, 66), clears a register Pn which counts the number of periods in which the duty cycle intensifying operation is executed is cleared (step 66), a register Cn which determines the time interval during which the flash intensifying operation has been executed is cleared (step 68), 1 sec timer which monitors the time duration of the duty cycle intensifying operation is started (step 68a), and the adjustments PA and PB for the initial value to be used in the duty cycle intensifying operation are calculated (steps 69, 70; because this is the first duty cycle intensifying operation, the content of the register OPD is equal to 0 (steps 52, 60) and Tdec indicates the time duration of the immediately preceding decompression which took place for the first time). This is achieved by reading the adjustment PA (FIG. 4e) corresponding to the content of the register OPD and the adjustment PB (FIG. 4f) corresponding to the register Tdec from an associated memory, and writing them into registers PA and PB.

If it is found that the operation in the duty cycle intensifying mode is to be executed for the next pass, namely, after 5 msec, the program now proceeds through steps 56-65-71, incrementing the register Cn and examining if the content of the register Cn is equal to A, thus indicating that the time duration of the flash intensifying operation has reached a given time interval (step 72). The program goes through steps 56-65-71 -72 and then returns until the given time interval is reached. When the given time interval has been reached, DPs+PA+PB is written into the duty cycle register RDU. Thus, the content of the duty cycle register RDU was equal to a duty cycle used in the flash intensifying mode, representing a fraction of a time interval for the intensifying operation over one period 40 msec, but since the flash intensifying interval (A×5 msec) has passed, the duty cycle register RDU is updated to an initial value for the flash intensifying operation (step 73). DPs represents a standard value for the initial value to be used in the flash intensifying operation, PA represents an adjustment corresponding to the number of periods in which the previous duty cycle intensifying operation has been executed (which number is equal to 0 for the duty cycle intensifying operation of the first pass), and PB represents an adjustment which corresponds to the time duration Tdec of the previous decompression. After updating in this manner, CPU 11 delivers "0", indicating an intensifying mode, to the output port SL3 (step 74), starts the timer RDU which is used to examine the passage of a time interval indicated by the duty cycle register RDU (step 75) and also starts 40 msec timer (step 76).

After initiating the duty cycle intensifying operation of the first pass, when this operation is completed and the decompression of the second pass is to be initiated, the content of the duty cycle register RDU is left unchanged (a maximum duty cycle of the previous pass attained at output routine 19, to be described later, during the duty cycle intensifying operation in which the value of the duty cycle has been incremented by 2 msec for each period), while the number of periods Pn during which the previous duty cycle intensifying operation has been executed is written into the resiter OPD (step 60). Accordingly, referring to FIG. 4a, in the flash intensifying operation which immediately precedes the duty cycle intensifying operation of the second pass, the duty cycle used is equal to the final duty cycle of the duty cycle intensifying operation of the first pass, and the adjustment PA for the initial value of the duty cycle intensifying operation of the second pass is equal to the adjustment shown in FIG. 4e (namely, the adjustment PA determined by Pn×40 where Pn represents the number of periods in which the duty cycle intensifying operation of the first pass has been executed).

The flag register Ffr contains "1" after the initiation of the ASB control, and accordingly CPU 11 calculates the slip rate Sfr every time the ASB control (routine 15) is entered with the period of 5 msec. The program then proceeds from step 47a to 47b and 47c to determine if the conditions to terminate the ASB control are satisfied. If the conditions are satisfied, the ASB control is terminated by steps 51 to 54. As long as the conditions to terminate the ASB control are not satisfied, the program proceeds through steps 47–47a–47b–47c –50a where it determines if the relationship between the slip rate Sfr and the wheel acceleration dVfr lies either in the decompression region or the duty cycle intensifying region, thus deriving data for the ASB control in accordance with the result of such decision.

Figure 3C:
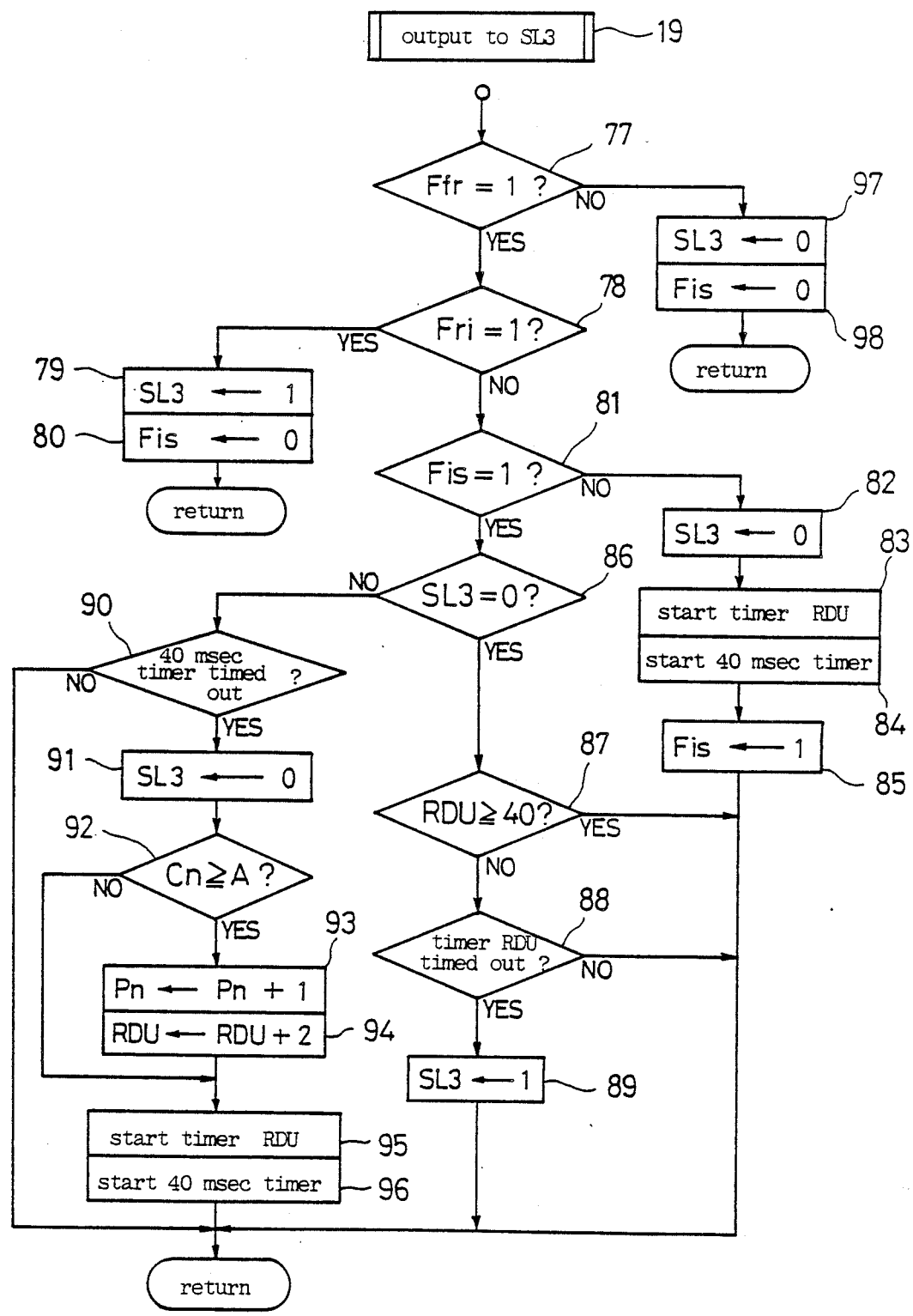

Referring to FIG. 3c, the delivery of an output to SL3 (routine 19) will now be described in detail. To help understanding the invention, it is assumed that the rotating condition (the slip rate Sfr and the wheel acceleration dVfr) of the wheel FR has cycled through the initiation of the ASB control (the decompression of the first pass)—the duty cycle intensifying operation of the first pass—the decompression of the second pass—the duty cycle intensifying operation of the second pass—the termination of the ASB control.

When the ASB control is initiated (namely, the decompression of the first pass), it will be noted that the ASB control of the wheel brake 6 (routine 15) resulted in the flag register Ffr being set to "1" (step 58). The flag register Ffi is also reset to "1" (step 59), the register OPD has a content of Pn=0 (steps 52, 60), the register Tdec has a content of 0 (step 61), and the duty cycle register RDU has a content of (DPs+a) (step 54). When delivering an output to SL3 (routine 19), CPU 11 delivers "1" (the decompression) to the output port SL3 (step 79), and writes "0" (indicating that the operation is in the process of decompression) to a flag register Fis (step 80). If the delivery of an output to the output port SL3 is entered during a next and a subsequent pass while the decision (FIG. 3b) during the ASB control (routine 15) of the wheel brake 6 remains in its "decompression" mode, only steps 79 and 80 are executed. In the meantime, the ASB control (routine 15) of the wheel brake 6 counts the time duration Tdec of the decompression of the first pass (steps 56–57–63–64).

When the decision rendered (FIG. 3b) during the ASB control (routine 15) of the wheel brake 6 changes from the "decompression" to "duty cycle intensification", steps 65-66 to 68-60-70 are executed during this routine, and in the routine 19 in which an output is delivered to the output port SL3, CPU 11 proceeds through steps 77-78 -81-82, delivering "0" (indicating the intensification) to the output port SL3 (step 82), starting the timer RDU (the time limit at this time being equal to the content of the duty cycle register RDU, which is in turn equal to DPs+a) (step 83), starts the 40 msec timer (step 84) and then writing "1"(indicating in the process of the duty cycle intensifying) into the flag register Fis (step 85). This starts the flash intensification of the first pass. Subsequently the program proceeds through steps 77-78 -81-86-87, examining the time-out of the timer RDU and delivering "1" (decompression) to the output port SL3 upon time-out. When the content of RDU is equal to or in excess of 40 msec, this means a continuous intensification. In this instance, the intensifying mode (SL3=0) is continued without examining if the timer RDU has timed out. In the following description, it is assumed that the content of RDU is less than 40 msec.

When the timer RDU times out to deliver "1" (decompression) to the output port SL3, the program now proceeds to steps 86–90, examining if the 40 msec timer has timed out, delivering "0" (intensification) to the output port SL3 if it has timed out (thus, ending the time interval of one period) (step 91) and examining if the content of the register Cn has become equal to A (step 92). If the content of the register Cn is not equal to A, the timer RDU is restarted (step 95), 40 msec timer is restarted (step 96), thus performing the flash intensification of the next period. In the meantime, the register Cn is incremented by one every 5 msec during the ASB control of the brake 6 (routine 15). When the content Cn becomes equal to A, meaning that 5A msec has passed since the commencement of the flash intensifying operation, a duty cycle intensifying operation of the first pass (steps 71 to 76) is initiated in the ASB control (routine 15) of the wheel brake 6. Accordingly, the duty cycle register RDU is updated to DPs+PA (=0)+PB, namely, to an initial value for the duty cycle intensifying operation of the first pass, delivering "0" (intensification) to the output port SL3.

In routine 19 in which an output is delivered to the output port SL3, CPU 11 executes steps 77-78-81-86-87-88, waiting for the timer RDU to time out. Upon time-out, it delivers "1" (the decompression) to the output port SL3, and then waits for the 40 msec timer to time out by proceeding through steps 77-78-81-86 -90. Upon time-out, or at the completion of the first period for the duty cycle intensifying operation of the first pass, Cn is equal to or greater than A, and hence the register Pn (having an initial value of 0: step 67) is now incremented by one (step 93). The duty cycle register RDU is incremented by two, thus increasing the intensifying interval by 2 msec (step 94), the timer RDU is started in order to determine the intensifying interval of the next period, and 40 msec timer is started to determine the end of the next period (step 95). Subsequently, the program proceeds through steps 77–78 -81-86-8-7-88. As long as the decision for the duty cycle intensification prevails, the duty cycle intensifying operation of the first pass is repeated, beginning with the initial value and increasing the intensifying interval by 2 msec after each period.

When the decision rendered during the ASB control routine 15 of the wheel brake 6 changes to the decompression (for the second pass), the program proceeds through steps 57-63-59-60-61 where "1" (the compression) is written into the flag register Fri, the current content of the register Pn (the number of periods in which the duty cycle intensifying operation of the first pass has been executed) is written into the register OPD, and the register Tdec is cleared. In the corresponding manner, in the output routine 19, the program proceeds through steps 77-78-79-80 in which CPU 11 delivers "1" (decompression) to the output port SL3, and changes the content of the register Fis to "0" (in the process of decompression). This represents the initiation of the decompression of the second pass. The time duration of the decompression of the second pass is determined at step 64 during the ASB control routine 15 of the wheel brake 6.

When the decision rendered during the ASB control routine 15 changes from the decompression (for the second pass) to the duty cycle intensification (for the second pass), the program proceeds through steps 65 to 70 of the routine 15 where an adjustment PA (FIG. 4e) for the initial value which corresponds to the number of periods in which the duty cycle intensifying operation of the first pass has been executed is written into the register PA, and an adjustment PB (FIG. 4a) for the initial value which corresponds to the time duration Tdec of the decompression of the second pass is written into the register PB. It will be noted that the content of the duty cycle register RDU indicates the intensifying interval of the last period used during the duty cycle intensifying operation of the first pass.

In the output routine 19 in which an output is delivered to the output port SL3, the program proceeds through steps 77-78-81-82 to 85 where CPU 11 initiates an intensifying operation of the first period for the flash intensification of the second pass, and subsequently performs a control operation which is similar to the flash intensification of the first pass and the duty cycle intensification of the first pass mentioned previously. However, it is to be noted that the duty cycle used during the flash intensification of the second pass assumes a value corresponding to the duty cycle in the last period of the duty cycle intensification of the first pass, and the initial value for the duty cycle intensification of the second cycle is equal to DPs (standard value)+PA (an adjustment corresponding to the number of periods Pn in which the duty cycle intensifying operation of the first pass has been executed)+PB (an adjustment corresponding to the time duration Tdec of the decompression of the second pass).

When it is determined that the ASB control is to be terminated during the ASB control routine 15, the program proceeds through steps 51 to 54 where the flag register Ffr is cleared, the registers Pn and Cn are cleared, and the duty cycle register RDU is updated to (DPs+a). In the output routine 19 in which an output is delivered to the output port SL3, CPU 11 responds thereto by executing the steps 77-97-98, thus delivering "0" (intensification) to the output port SL3 and clearing the flag register Fis.

In the embodiment described above, an adjustment PA for the initial value of the duty cycle intensifying operation of the next pass is calculated in accordance with the number of periods into which the duty cycle intensifying operation of the previous pass has been executed. However, such adjustment may be calculated in accordance with the time duration of the duty cycle intensifying operation of the previous pass. In addition, the flash intensification which precedes the duty cycle intensifying operation may take place over a given number of periods rather than during a given time interval of 5A msec. In this instance, the step 71 may be transposed to a location between the steps 90 and 91.

Adjustments PA and PB for the initial values are previously stored in a memory. However, they may be chosen as a function of Pn and Tdec as variables, respectively, thus allowing these adjustments to be calculated according to such functions. In the embodiment, the duty cycle is incremented by a given amount after each period during the duty cycle intensifying operation. However, the increment may be increased in a gradual manner, or may be increased at a rate which is in inverse in proportion to the decompression interval of the previous pass and in proportion t the time duration during which the duty cycle intensifying operation of the previous pass has been executed.

As described, in accordance with the invention, the switching valve means (3, 3A, 4, 4A) operate to connect selectively the wheel brakes (6 to 9) to the high pressure (2, 18, 18A) and the low pressure (20, 20A) of the source of brake pressure (2, 18, 18A, 20, 20A), and thus are generally equal in number to the number of solenoid-operated open/close valves which ar used in the prior art for purpose of decompression or intensification. Accordingly, where the brake pressure for each of the four wheels are to be controlled independently, four switching valve means (3, 3A, 4, 4A) are all that is required. In terms of the number of mechanical elements involved, the valve means (3, 3A, 4, 4A) have substantially reduced the eight solenoid valves used in the prior art to only four, thus reducing the cost required for the valve means and achieving a saving in the space requirement which is devoted to the provision of valve means.

It will be understood that the mere provision of switching valve means (3, 3A, 4, 4A) which switch between high and low pressures is only capable of a selection between the decompression and the intensification, but is unable to establish a holding mode, resulting in a rough control over the wheel brake pressure. However, in accordance with the invention, brake pressure control means (11) is provided in order to achieve a smooth control over the wheel brake pressure. As mentioned previously, the brake pressure control means 11 allows pressures corresponding to a gradual decompression, a holding and a gradual intensification to be utilized as wheel brake pressures, by using a duty cycle when the switching valve means (3, 3A, 4, 4A) are repeatedly turned off (intensification; wheel brake connected to the high pressure) and on (decompression; wheel brake connected to the low pressure). Specifically, a duty cycle for the intensifying operation is equal to the ratio of off interval/(one period of turn-on and -off), which is in turn equal to the ratio of intensifying interval over the sum of the intensifying interval and the decompressing interval. When the decision changes from the need to decompress to no need to decompress, the duty cycle intensifying operation is executed to change the duty cycle from a low value to a sequentially higher value, thus gradually increasing the wheel brake pressure. In this manner, a wheel brake pressure control is achieved which is equivalent to a change from the holding to the intensifying mode or a change from a gradual decompression —holding—gradual intensification—intensification which has been achieved in the prior art.

When the pressure is controlled in accordance with the duty cycle in this manner, the wheel brake pressure rises at a rate which depends on the particular value of the wheel brake pressure which prevailed immediately before the duty cycle control is entired, despite an equal value of duty cycle is employed. If the duty cycle control is performed always in a given pattern, there arises difficulties that the rate in which the brake pressure rises may be retarded to result in an increased braking distance, or that the rate with which the brake pressure rises is too rapid to require the decompression again at an early stage, causing a greater fluctuation in the brake pressure. These difficulties are eliminated in accordance with the invention in which the brake pressure control means (11) chooses an initial value (PA) when entering the duty cycle control which changes with the number of periods (Pn) in which the duty cycle control of the previous pass has been repeated or the time duration of such duty cycle control of the previous pass. In this manner, the brake pressure can be controlled in a smooth and reliable manner. Thus, the number of periods (Pn) in which the duty cycle control of the previously pass has been executed or the time duration thereof represents an optimum brake pressure, which thus can be utilized as a measure of an estimated optimum value for the current wheel brake pressure. When the initial value used during the next duty cycle control is chosen in accordance with such measure, the duty cycle control may take place in a pattern which corresponds to the optimum value of the wheel brake pressure.

What we claimed is:

1. An antiskid control system for a vehicle having a plurality of wheels, each having a wheel brake, comprising:
   a source of brake pressure for providing a high pressure and a low pressure;
   switching valve means interposed between each wheel brake of said vehicle and said source for selectively connecting a fluid path to each wheel brake for low pressure and high pressure;
   means for detecting rotational speeds of said wheels of said vehicle;
   calculation means for calculating a reference speed on the basis of said rotational speeds of said wheels and for calculating acceleration of a wheel on which a wheel brake is mounted on the basis of the rotational speed detected with respect to the wheel;
   decision means for detecting a first condition when the acceleration and slip rate defined by the rotational speed of a wheel and the reference speed are in a predetermined decompression region and for detecting a second condition when the acceleration and slip rate are in a predetermined duty cycle intensifying region outside said decompression region;

brake pressure control means for establishing a decompressing mode for the switching valve means in which the fluid path to a wheel brake is connected to the low pressure when the first condition is detected and for controlling the switching valve means in a duty cycle intensifying mode in which an intensifying mode for the switching valve means in which the fluid path to a wheel brake is connected to the high pressure and said decompressing mode are alternately repeated when the second condition is detected;

said brake pressure control means, in the duty cycle intensifying mode, sequentially increasing a duty cycle defined by a ratio of an interval of the intensifying mode to a period of alternate repetition of the intensifying mode and the decompression mode; and said brake pressure control means determining the length of duration of said duty cycle intensifying mode prosecuted, for establishing an initial value of the duty cycle of a succeeding duty cycle intensifying mode which varies with the length of the preceding duty cycle intensifying mode when the decision means repeatedly detects the second condition.

2. An antiskid control system according to claim 1, wherein said brake pressure control means determines the length of duration of the decompressing mode initiated in response to the detection of the first condition for choosing an initial value for the duty cycle intensifying mode which is in inverse proportion to the length of the initiated decompressing mode.

3. An antiskid control system according to claim 1, wherein said decision means repeatedly detects said second condition, the brake pressure control means effects, immediately before said succeeding duty cycle intensifying mode, a flash duty cycle intensifying mode, a duty cycle of which corresponds to the final duty cycle used during said preceding duty cycle intensifying mode, for a given length of time.

4. An antiskid control system according to claim 2, wherein said decision means repeatedly detects the second condition, the brake pressure control means effects, immediately before said succeeding duty cycle intensifying mode, a flash duty cycle intensifying mode, a duty cycle of which corresponds to the final duty cycle used during said preceding duty cycle intensifying mode, for a given length of time.

* * * * *